(12) United States Patent
Suzuki et al.

(10) Patent No.: US 6,188,363 B1
(45) Date of Patent: Feb. 13, 2001

(54) ANTENNA HOLD DEVICE

(75) Inventors: Akihiro Suzuki; Noriyoshi Satoh, both of Kanagawa (JP)

(73) Assignee: Matsushita Electric Industrial Co., Ltd., Osaka (JP)

(*) Notice: Under 35 U.S.C. 154(b), the term of this patent shall be extended for 0 days.

(21) Appl. No.: 09/437,934

(22) Filed: Nov. 10, 1999

(30) Foreign Application Priority Data

Nov. 11, 1998 (JP) .................................................. 10-335013

(51) Int. Cl.⁷ ....................................................... H01Q 1/24
(52) U.S. Cl. ............................................. 343/702; 343/900
(58) Field of Search .................................... 343/702, 715, 343/900, 901; 455/89, 90

(56) References Cited

U.S. PATENT DOCUMENTS

| | | | |
|---|---|---|---|
| 5,177,492 | 1/1993 | Tomura et al. | 343/702 |
| 5,353,036 | * 10/1994 | Baldry | 343/702 |
| 5,434,582 | 7/1995 | Koike et al. | 343/702 |
| 5,467,097 | * 11/1995 | Toko | 343/702 |
| 5,534,878 | 7/1996 | Johnson | 343/702 |
| 5,739,792 | 4/1998 | Hassemer et al. | 343/702 |

OTHER PUBLICATIONS

Patent Abstracts of Japan, Publication No. 10032411, Publication Date Mar. 2, 1998.
Patent Abstracts of Japan, Publication No. 07321522, Publication Date Aug. 12, 1995.

* cited by examiner

*Primary Examiner*—Tan Ho
(74) *Attorney, Agent, or Firm*—Pearne & Gordon LLP

(57) ABSTRACT

The antenna hold device comprises a transmitting and receiving antenna which can be stored within the main body portion of the antenna hold device, and a cylindrical-shaped antenna guide for guiding the main body portion storage side of the transmitting and receiving antenna. And, the present antenna hold device is characterized by clearance eliminating means which, when the transmitting and receiving antenna is guided to and stored in the main body portion storage side of the antenna hold device, eliminates a clearance between the above-mentioned antenna guide and the leading end of the main body portion of the transmitting and receiving antenna. Thanks to this structure, there can be obtained an effect that, even when there arrives a receiving call through vibrations, no vibration can be produced in the leading end of the antenna main body portion and thus no strange sound (irregular sound) can be generated.

13 Claims, 4 Drawing Sheets

CLEARANCE    CLEARANCE

ANTENNA HOLD DEVICE

BACKGROUND OF THE INVENTION

The present invention relates to an antenna hold device for holding a transmitting and receiving antenna which is assembled from outside of a box body of electronic equipment such as radio equipment, a portable (cellular) phone or the like.

Conventionally, when a transmitting and receiving antenna to be assembled from outside of a box body of electronic equipment such as radio equipment, a portable (cellular) phone or the like is stored into the main body portion of the electronic equipment, there is not disposed an antenna hold device which is used to eliminate a clearance between the antenna and the box body of electronic equipment.

Therefore, when a receiving call is made through vibrations while the transmitting and receiving antenna is being stored within the box body of the electronic equipment, since there is present a clearance (gap) between an antenna stopper and an antenna guide, the leading end of the main body portion of the antenna is vibrated due to the above vibrations to thereby generate a strange sound (irregular sound). That is, the electronic equipment has a vibration function, whereas vibrations generated by the vibration function also cause the antenna main body portion leading end to vibrate, thereby producing a strange sound (abnormal sound) which annoys a user. cl SUMMARY OF THE INVENTION In solving the above problem, according to the invention, there is provided an antenna hold device comprising a transmitting and receiving antenna which can be stored within the main body portion of the present antenna hold device, and a cylindrical-shaped antenna guide for guiding the main body portion storage side of the transmitting and receiving antenna, characterized by clearance eliminating means which, when the transmitting and receiving antenna is guided to and stored in the main body portion storage side of the antenna hold device, eliminates a clearance (a gap) between the leading end of the main body portion of the transmitting and receiving antenna and the above-mentioned antenna guide.

According to the invention as set forth in Aspect 1, there is provided an antenna hold device comprising a transmitting and receiving antenna which can be stored within the main body portion of the present antenna hold device, and a cylindrical-shaped antenna guide for guiding the main body portion storage side of the transmitting and receiving antenna, characterized by clearance eliminating means which, when the transmitting and receiving antenna is guided to and stored in the main body portion storage side of the antenna hold device, eliminates a clearance (a gap) between the leading end of the main body portion of the transmitting and receiving antenna and the above-mentioned antenna guide. Thanks to this structure, there can be obtained an operational effect that, even when there is made a receiving call through vibrations, no vibration can be produced in the leading end of the antenna main body portion and thus no strange sound (irregular sound) can be generated.

Also, according to the invention as set forth in Aspect 2, in an antenna hold device as set forth in Aspect 1, there is formed a taper portion in the leading end portion of the clearance eliminating means. That is, according to the invention as set forth in Aspect 2, there can be provided an operational effect that provision of the taper portion in the leading end portion of the clearance eliminating means makes it possible to facilitate the storage of the antenna stopper of the antenna hold device.

Further, according to the invention as set forth in Aspect 3, in an antenna hold device as set forth in Aspect 1, the clearance eliminating means is disposed inside of the rear end portion of the antenna guide and is structured such that the section shape thereof increases in thickness in a direction in which the above clearance increases in size when the transmitting and receiving antenna is stored into the main body portion storage side of the antenna hold device. That is, according to the invention as set forth in Aspect 3, there can be provided an operational effect that, when making a receiving call through vibrations while the transmitting and receiving antenna is being stored, no strange sound (irregular sound) can be generated.

DETAILED DESCRIPTION OF THE PREFERRED EMBODIMENTS

Now, description will be given below of an embodiment of an antenna hold device according to the invention with reference to the accompanying drawings.

Figure 1:
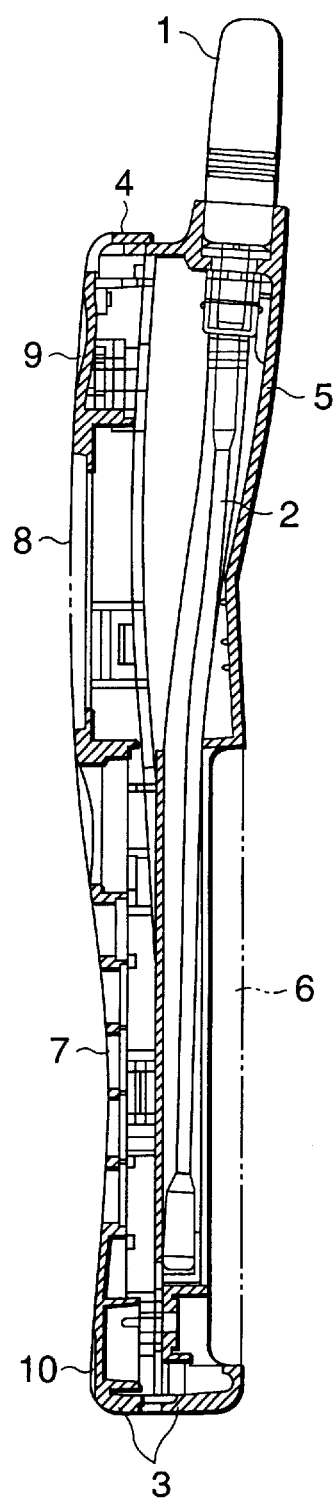
FIG. 1 is a side section view of a portable radio phone incorporating therein an antenna hold device according to an embodiment of the invention.

FIG. 1 is a side section view of a portable radio phone which is one of radio equipment and includes an antenna hold device according to the invention. In FIG. 1, the portable radio phone comprises a transmitting and receiving antenna 1 which is used to transmit and receive a high frequency signal, and a main body portion 2; and, the main body portion 2 of the radio phone is stored between a cover 4 and a case 5 cooperating in forming a box body 3. In FIG. 1, there is shown a state in which the main body portion 2 is stored within the box body 3.

Within the box body 3, there are further stored a receiver 9 for outputting a sound, a key sheet 7 serving as input means for inputting characters, symbols, numerals and the like, a liquid crystal display device 8 for displaying the inputted characters, symbols, numerals and the like, and a transmitter 10 together with a printed circuit board (not shown). Also, on the case 5 side of the box body 3, there is removably mounted a battery 6 for supplying electric power to the present portable radio phone.

Figure 2:
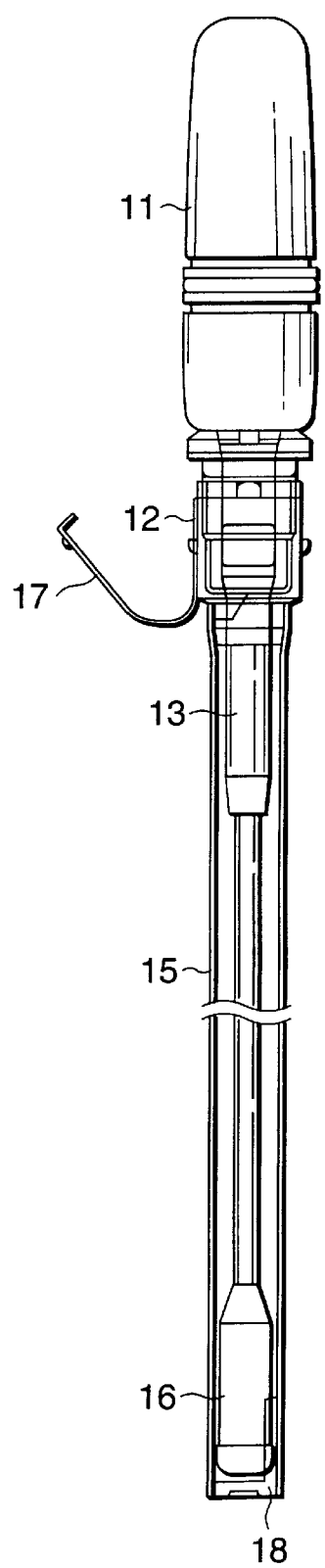
FIG. 2 is a side section view of a portable radio phone incorporating therein an antenna hold device according to the embodiment of the invention, showing only the portions thereof that relate to a transmitting and receiving antenna employed in the portable radio phone shown in FIG. 1.

Now, FIG. 2 shows only the portions that relate to the transmitting and receiving antenna 1 of the portable radio phone shown in FIG. 1 according to the embodiment of the invention. In FIG. 2, as the parts relating to the transmitting and receiving antenna 1, there are shown an antenna top 11, an antenna holder 12 for holding the transmitting and receiving antenna 1 in the box body 3, an antenna sleeve 13 capable of functioning as an antenna while the transmitting and receiving antenna 1 is being stored, an antenna guide 15 for guiding and storing the main body portion of the antenna 1, an antenna stopper 16 which, when the transmitting and receiving antenna 1 is extended, prevents the antenna 1 from removing from the box body 3 as well as functions as an antenna, a spring 17 which is assembled to the antenna holder 12 for electrical connection with a land disposed on a printed circuit board (not shown) and also which has a contact in the leading end portion thereof, and clearance eliminating means 18 for eliminating a clearance (gap) between the leading end of the main body portion of the antenna 1 and the above-mentioned antenna guide 15.

The clearance eliminating means 18 is composed of a plug portion for closing the rear end portion of the antenna guide 15 and an longitudinal rib which extends in parallel to the moving direction of the antenna stopper 16, while the longitudinal rib includes a taper portion in the leading end portion thereof.

And, the clearance eliminating means 18 is formed separately from the antenna guide 15; that is, the clearance eliminating means 18 is connected integrally with the antenna guide 15 in such a manner that the clearance eliminating means 18 is firstly inserted into the rear end portion of the antenna guide 15 and is then united integrally to the antenna guide 15 by ultrasonic welding, or by adhesion, or by pressure insertion.

However, alternatively, the clearance eliminating means 18 may also be formed integrally with the antenna guide 15.

Figure 3:
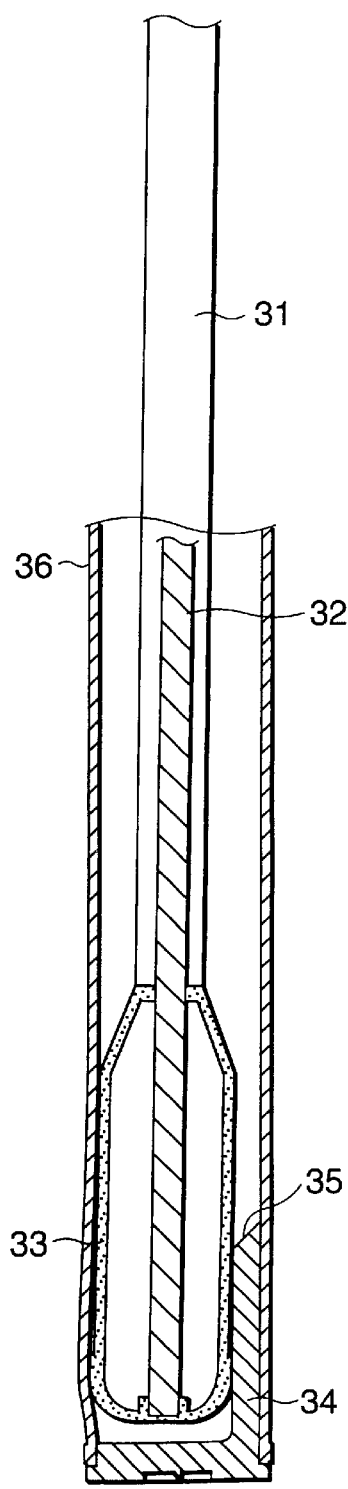
FIG. 3 is a section view of an antenna hold device according to an embodiment of the invention; and, FIG. 4 is a partially sectional view of the above antenna hold device according to the invention, showing a state thereof in which the transmitting and receiving antenna is separated from the present antenna hold device.

Next, description will be given below of an operation to hold the transmitting and receiving antenna 1 with reference to FIGS. 3 and 4. FIG. 3 is a section view of an antenna hold device according to an embodiment of the invention, and FIG. 4 is a partially sectional view of the antenna hold device according to the embodiment of the invention, showing a state in which the transmitting and receiving antenna 1 is removed from the present antenna hold device.

Figure 4:
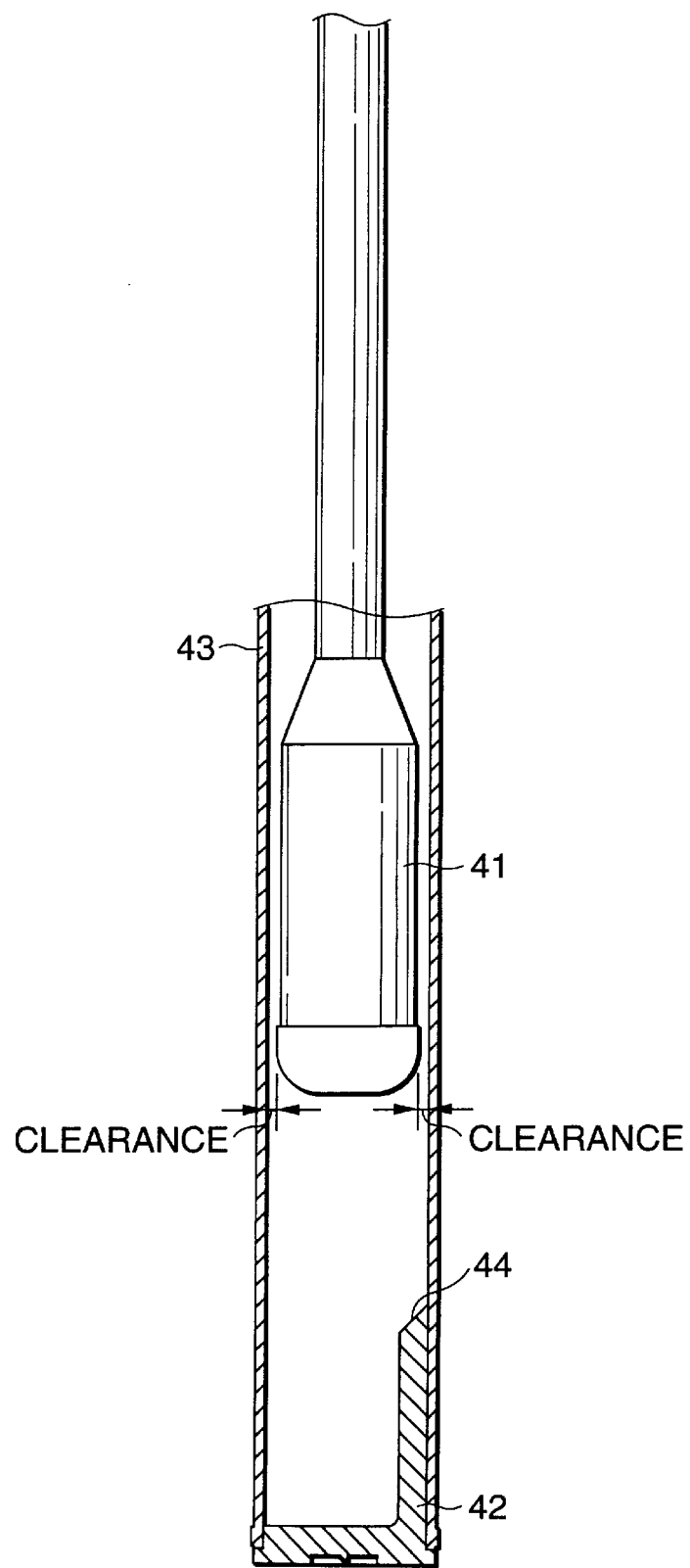

In FIG. 4, there is shown clearance eliminating means 42 which is disposed inside of the rear end portion of an antenna guide 43. And, on the antenna main body side of the clearance eliminating means 42, there is disposed a taper portion 44 which is used to facilitate the storage of the antenna 1, in more particular, an antenna stopper 41, while the antenna stopper 41 is held in a state in which it is separated from the clearance eliminating means 42; and thus it can be understood that, in this stage, there exists a clearance (gap) between the antenna stopper 41 and antenna guide 43.

Next, as the storage of the antenna 1 advances further from the state shown in FIG. 3, an antenna stopper 33 passes through the taper portion 35 of clearance eliminating means 34 and is thereby stored in such a state where there has been eliminated the above-mentioned clearance between the antenna stopper 33 and antenna guide 36. Therefore, there is obtained such a state as shown in FIG. 3: that is, even if there is made a receiving call through vibrations, no vibration can be produced in the leading end of the main body portion of the antenna 1 and thus no strange sound (irregular sound) can be generated.

As described above, in the conventional portable radio phone, since there is present a clearance between the antenna stopper and antenna guide while the antenna thereof is being stored, the antenna is stored in acantilevered manner. On the other hand, according to the invention, as in the illustrated embodiment thereof, due to provision of the clearance eliminating means, the antenna can be stored in such a manner that it is supported on both sides thereof, thereby being able to enhance the rigidity of the antenna, with the result that vibrations in the central portion of the antenna as well as in the neighborhood thereof can be reduced.

By the way, in FIG. 3, an antenna element core line 32 forming the main body portion of the antenna is covered with a resin cover 31 and is also connected to the antenna stopper 33 which is formed of conductive metal.

As has been described hereinbefore, an antenna hold device according to the invention comprises a transmitting and receiving antenna which can be stored within the main body portion of the antenna hold device, and a cylindrical-shaped guide for guiding the main body portion storage side of the transmitting and receiving antenna; and, the present antenna hold device is characterized by clearance eliminating means which, when the transmitting and receiving antenna is guided to and stored in the main body portion storage side of the antenna hold device, eliminates a clearance between the above-mentioned guide and the leading end of the main body portion of the transmitting and receiving antenna. Thanks to this structure, there can be obtained an effect that, even when there arrives a receiving call through vibrations, no vibration can be produced in the leading end of the main body portion of the antenna and thus no strange sound (irregular sound) can be generated.

What is claimed is:

1. An antenna hold device for a radio phone, said radio phone having a main body portion, said antenna hold device comprising:

a transmitting and receiving antenna that is adapted to move between a storage position in which said antenna is stored within the main body portion of the radio phone and a use position wherein said antenna at least partially extends from said main body portion, a cylindrical-shaped antenna guide for guiding said transmitting and receiving antenna between said storage and use positions, and clearance eliminating means which, when said transmitting and receiving antenna is in said storage position, eliminates a clearance between a leading end of said transmitting and receiving antenna and said antenna guide and wherein the clearance between the leading end of the antenna and the antenna guide is restored when said antenna is moved away from said storage position and toward said use position.

2. The antenna hold device as in claim 1, wherein leading end of said clearance eliminating means includes a tapered portion to assist in guiding the leading end of said transmitting and receiving antenna to the desired location.

3. The antenna hold device as in claim 1, wherein said clearance eliminating means is disposed inside of a rear end portion of said antenna guide, and is structured such that a section shape thereof increases in thickness in a direction from said use position toward said storage position such that, when said transmitting and receiving antenna is in said storage position, said leading end of said antenna is in engagement with said clearance eliminating means and said antenna guide.

4. The antenna hold device as claimed in claim 1, wherein said leading end of the antenna includes a stopper that also serves to prevent said antenna from being completely removed from said antenna guide.

5. The antenna hold device as claimed in claim 4, wherein, when said antenna is in said storage position, said stopper simultaneously engages said antenna guide and said clearance eliminating means.

6. An antenna hold device comprising:

a transmitting and receiving antenna having a main body portion, said antenna being adapted for storage within said antenna hold device, a cylindrical-shaped antenna guide for guiding said main body portion of said transmitting and receiving antenna, and clearance eliminating means which, when said transmitting and receiving antenna is guided to and stored in said antenna hold device, eliminates a clearance between a leading end of said main body portion of said transmitting and receiving antenna and said antenna guide, said clearance eliminating means is disposed inside of a rear end portion of said antenna guide, and is structured such that a section shape thereof increases in thickness in a direction where said clearance decreases in size when said transmitting and receiving antenna is stored into said antenna hold device.

7. The antenna hold device as in claim 6, wherein a leading end of said clearance eliminating means includes a tapered portion to assist in guiding the leading end of said transmitting and receiving antenna to the desired location.

8. The antenna hold device as claimed in claim 6, wherein said leading end of the antenna includes a stopper that also serves to prevent said antenna from being completely removed from said antenna guide.

9. An antenna hold device for a radio phone, said radio phone having a main body portion, said antenna hold device comprising:

a transmitting and receiving antenna that is adapted to move between a storage position in which said antenna is stored within the main body portion of the radio phone and a use position wherein said antenna at least partially extends from said main body portion, a cylindrical-shaped antenna guide for guiding said transmitting and receiving antenna between said storage and use positions, and clearance eliminating device that, when said transmitting and receiving antenna is in said storage position, eliminates a clearance between a leading end of said transmitting and receiving antenna and said antenna guide and wherein the clearance between the leading end of the antenna and the antenna guide is restored when said antenna is moved away from said storage position and toward said use position.

10. The antenna hold device as in claim 9, wherein said clearance eliminating device includes a plug portion and a longitudinal rib that extends parallel to a moving direction of said antenna, said rib including a tapered leading end portion.

11. The antenna hold device as in claim 9, wherein a leading end of said clearance eliminating device includes a tapered portion to assist in guiding the leading end of said transmitting and receiving antenna to the desired location.

12. The antenna hold device as in claim 9, wherein said leading end of the antenna includes a stopper that also serves to prevent said antenna from being completely removed from said antenna guide.

13. The antenna hold device as claimed in claim 12, wherein, when said antenna is in said storage position, said stopper simultaneously engages said antenna guide and said clearance eliminating device.

\* \* \* \* \*